United States Patent [19]

Carlson et al.

[11] Patent Number: 5,542,046
[45] Date of Patent: Jul. 30, 1996

[54] SERVER ENTITY THAT PROVIDES SECURE ACCESS TO ITS RESOURCES THROUGH TOKEN VALIDATION

[75] Inventors: Brent A. Carlson; Frederic L. Huss; Nancy M. Schmucki; Richard E. Zelenski, all of Rochester, Minn.

[73] Assignee: International Business Machines Corporation, Armonk, N.Y.

[21] Appl. No.: 459,451

[22] Filed: Jun. 2, 1995

Related U.S. Application Data

[62] Division of Ser. No. 324,289, Oct. 17, 1994, which is a continuation of Ser. No. 943,654, Sep. 11, 1992, abandoned.

[51] Int. Cl.$^6$ .............................. G06F 13/14; G06F 13/10; H04L 9/00

[52] U.S. Cl. ............................ 395/186; 395/821; 380/4; 380/25; 340/825.34; 364/286.4; 364/286.5; 364/284; 364/284.2; 364/238.3; 364/DIG. 1

[58] Field of Search ......................... 395/200.06, 200.12, 395/425, 575, 186, 200.03, 200.12, 821; 380/4, 25, 23; 235/380; 340/825.31, 825.34; 370/85.4

[56] References Cited

U.S. PATENT DOCUMENTS

| | | | |
|---|---|---|---|
| 4,450,535 | 5/1984 | de Pommery et al. | 364/900 |
| 4,583,088 | 4/1986 | Bux et al. | 340/825.5 |
| 4,590,468 | 5/1986 | Stieglitz | 340/825.5 |
| 4,817,140 | 3/1989 | Chandra et al. | 380/4 |
| 5,018,139 | 5/1991 | Despres | 370/94.3 |
| 5,023,773 | 6/1991 | Baum et al. | 364/200 |
| 5,113,499 | 5/1992 | Ankney et al. | 395/325 |
| 5,146,575 | 9/1992 | Nolan, Jr. | 395/425 |
| 5,237,614 | 8/1993 | Weiss | 380/23 |

OTHER PUBLICATIONS

Kerberos Version 5 RFC, Draft #4.
"TeleTrusT–OSIS and Communication Security", Karl Rihaczek.
"The Three–Headed Dog", Westlake Notes, May 31, 1990.

*Primary Examiner*—Gopal C. Ray
*Attorney, Agent, or Firm*—Steven W. Roth

[57] ABSTRACT

A peer to peer connection authorizer is described. The connection authorizer involves three different entities: a system authorizer mechanism, a client connection manager, and a server connection manager. The system authorizer resides on the main or primary CPU while the client and server connection managers reside on individual IOPs. To obtain information required by a user and/or an application program, the client connection manager issues a request to the system authorizer. When the system authorizer receives the request, it first verifies that the client device is who it claims to be. If the system authorizer determines that the client device should be allowed to access the requested information, it then sends a token to the server device and a copy of the same token to the client device. Upon receipt of the token copy from the system authorizer, the client connection manager packages the token copy into a message that it sends to the server device. When the server connection manager receives the message from the client device, it compares the token copy to the token it received from the system authorizer. If the tokens match, the server connection manager responds to the client device and the connection is established.

8 Claims, 12 Drawing Sheets

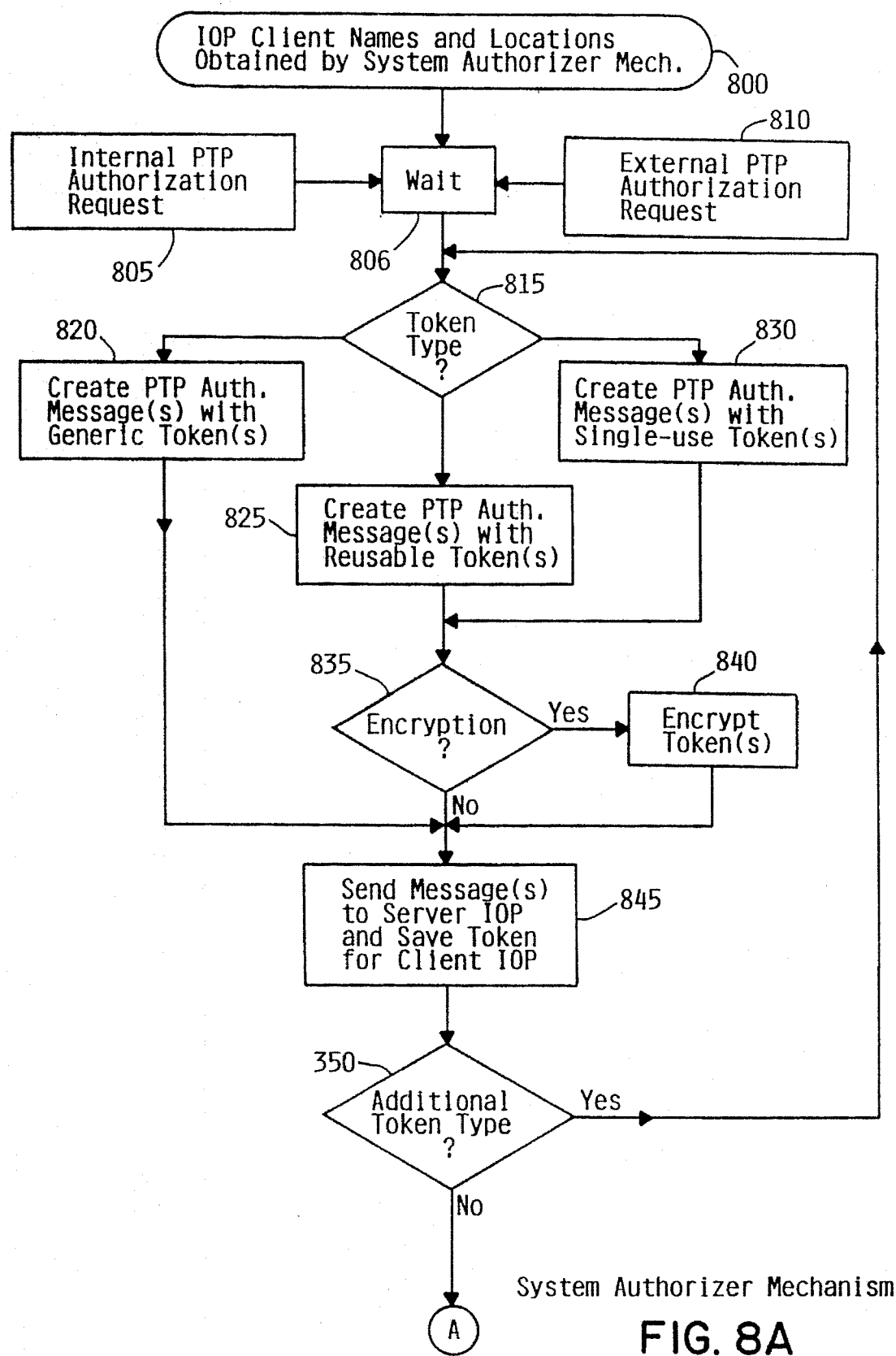
FIG. 8A — System Authorizer Mechanism

System Authorizer Mechanism

Server Connection Manager

Client Connection Manager

SERVER ENTITY THAT PROVIDES SECURE ACCESS TO ITS RESOURCES THROUGH TOKEN VALIDATION

This is a divisional of application Ser. No. 08/324,289 filed on Oct. 17, 1994, which is a continuation of Ser. No. 07/943,654 filed on Sep. 11, 1992, abandoned.

FIELD OF THE INVENTION

This invention relates to the data processing field. More specifically, this invention relates to the authorization of peer to peer connections.

BACKGROUND OF THE INVENTION

Since early computer systems performed only simple tasks, it was unnecessary for them to include more than one input/output unit (I/O unit). For this reason, computer systems such as the EDVAC device of 1948 contained only a single I/O unit. The I/O unit was merely the mechanism used by the computer system to communicate with the outside world. Since these early computer systems required a relatively small amount of information, the I/O unit could be controlled by the central processing unit (CPU) itself. As time passed, the complex tasks performed by computer systems required access to more and more information. Direct control of the I/O unit by the CPU was no longer practical.

In 1959, Univac Corporation introduced its LARC computer system. The LARC computer system included an input/output controller (IOC) which was itself a genuine computer. The IOC was used to handle the flow of information to and from the outside world, thereby reducing the work required of the CPU. While the IOC controlled up to eight I/O channels, modern day computer systems usually include a single I/O controller for each I/O channel. These I/O controllers are called input/output processors (IOPs). Similar to the IOC of the LARC computer system, IOPs are computer systems unto themselves. Each IOP is responsible for handling the information flow between a particular external device (i.e., "the outside world") and the computer system.

The wide use of IOPs has greatly improved the overall performance of today's computer systems. Computer systems can now communicate with a variety of external devices without overly burdening the CPU. Examples of devices which can be connected via IOPs include: terminals, magnetic storage units, optical storage devices, programmable workstations, and other computer systems. To the computer system, each of these external devices represents a resource that can be used to perform a specified task. In many cases, the task to be performed can be accomplished by the external devices without extensive intervention on the part of the CPU. This, of course, greatly reduces the work required of the CPU.

Since today's multimedia applications typically require extensive access to audio and video information, they are illustrative of the potential performance advantage of IOPs. The amount of data necessary to present a user with audio and video information is enormous. Hence, tremendous performance savings are possible in theory by allowing a multimedia application associated with an IOP to bypass the main CPU and access information from another IOP directly. Inherent in this noninterventionist approach, however, is the problem of securing information and resources. Allowing external devices to connect at will makes unauthorized use of system resources a real problem. Without some type of security, the users associated with the various external devices may attempt to gain access to personal or otherwise sensitive information. This problem is magnified when one considers that the computer system, the various IOPs, and the attached external devices may be owned or manufactured by different parties. In this later, worse case scenario, rogue IOPs may actually be introduced into the computer system to facilitate the unauthorized use of system resources (i.e., to steal information).

Solutions to this problem invariably involve some CPU intervention. Thus a balance is struck between efficiency and security. A computer system which is more secure tends to be less efficient while a computer system which is very efficient tends to be less secure. This tradeoff stems from the fact that highly secure computer systems must include a means (i.e., authorization means) to allow or disallow access to system resources. While authorization means do provide for increased security, they also create expensive performance overhead which reduces overall system efficiency. Hence, computer system designers are always attempting to design systems that are efficient yet secure (i.e., "to have their cake and eat it too").

A solution to a related security problem is an authorization model called Kerberos. Kerberos was jointly developed by Digital Equipment Corporation, International Business Machines Corporation (IBM), and the Massachusetts Institute of Technology (MIT) for use on an MIT campus-wide computer network.

Kerberos uses a system of messages and keys to deal with the security problem. To obtain information from a server device, a client device must first request authorization from a Kerberos server. This action triggers a series of encrypted messages which are sent by the Kerberos server to the client and server devices and from the client device to the server device. Eventually, the client device is able to connect to the server device.

Although Kerberos is an illustrative solution to a related security problem, Kerberos was not designed to solve the problem of rogue IOPs. Further, the Kerberos authentication model is itself flawed in many respects. One problem with the Kerberos model is its inherent complexity. Each device that wishes to participate in the authentication scheme must first register itself with the appropriate Kerberos server. To accomplish this, the subject device must first have knowledge about the resources controlled by particular Kerberos servers and then register with the appropriate Kerberos server or servers. The registration process is itself complex in that each Kerberos server must allocate a unique encryption key to each device. If multiple Kerberos servers are involved, each device must understand what key is to be used for what resources.

The inherent complexity of the Kerberos model is exacerbated by the model's dependence on encryption. The Kerberos model would simply not work without its elaborate system of key based encryption. Each device must support shared secret key cryptography and understand how the keys are used within the Kerberos protocol. When a Kerberos client device receives an authorization request, it must know what key is to be associated with the client device, what key is to be associated with the server device, and what unique key can be used to communicate between the two devices. When the client device receives this information from the Kerberos server, it must understand that it needs to use its key to decrypt the message sent to it, that it cannot decrypt the message sent from the Kerberos server to the server device, and that it must use the new key to encrypt its response message to the server device. When the server device finally gets the message from the client device, it must understand that it needs to use its shared secret key to access the new key and that it must use the new key to access the information from the client device. This complexity is compounded when one remembers that each device can be involved in multiple connections.

Yet another problem with the Kerbero's model and generally the noninterventionist approach, is the lack of resource information available to client devices. Beyond the need to understand the location of system resources for registration purposes, each client must expressly inform the Kerberos server of the name of the particular server device with which it wishes to communicate. The Kerberos model does not contemplate authorization on an entity to information basis. In other words, a client device cannot simply say "I want access to information X." A Kerberos server would reject such a request as lacking the appropriate server address information.

SUMMARY OF THE INVENTION

It is a principal object of this invention to provide an enhanced method and apparatus for communicating data among the components of a computer system.

It is another object of this invention to provide an enhanced method and apparatus for authorizing connections among the IOPs of a computer system.

It is yet another object of this invention to provide an enhanced method and apparatus for authorizing connections among like entities.

It is still another object of this invention to provide an enhanced method and apparatus for authorizing connections between a server entity and a plurality of client entities.

It is still another object of this invention to provide an enhanced method and apparatus for authorizing connections between a plurality of server entities and a single client entity.

It is still another object of this invention to provide an enhanced method and apparatus for authorizing connections between a plurality of server entities and a plurality of client entities.

It is still another object of this invention to provide an enhanced method and apparatus for preventing rogue IOPs from accessing system resources.

These and other objects are accomplished by the peer to peer connection authorizer disclosed herein.

Conceptually, the authorization technique used by the disclosed peer to peer connection authorizer involves three different entities: a system authorizer mechanism, a client connection manager, and a server connection manager. The system authorizer resides on the main or primary CPU while the client and server connection managers reside on individual IOPs.

To obtain information required by a user and/or an application program, the client connection manager issues a request to the system authorizer. Since the client application may or may not know the location of the desired information, the request may or may not include the address of a server device (i.e., the client connection manager will not provide the address of a server device when the location of the information is unknown to it). When the system authorizer receives the request, it first verifies that the client device is who it claims to be. The system authorizer then identifies the applicable server device by using either the address provided by the client connection manager or the information contained in the request. If the system authorizer determines that the client device should be allowed to access the information on the subject server device, it then sends a token to the server device and a copy of the same token to the client device. Depending on security needs, the token may or may not be encrypted. It is also possible that the requisite information resides on more than one server device or that more than one client device requires the information. The system authorizer handles multiple device situations by dispatching multiple tokens and token copies.

Upon receipt of the token copy from the system authorizer, the client connection manager packages the token copy into a message that it sends to the server device. When the server connection manager receives the message from the client device, it compares the token copy to the token it received from the system authorizer. If the tokens match, the server connection manager responds to the client device and the connection is established. If the tokens do not match, the server connection manager notifies the system authorizer of the failed connection attempt and then proceeds to inform the client device.

BRIEF DESCRIPTION OF THE DRAWINGS

FIGS. 8A and 8B show a logic flow diagram of the system authorizer mechanism of the present invention.

DESCRIPTION OF THE PREFERRED EMBODIMENT

Figure 1:
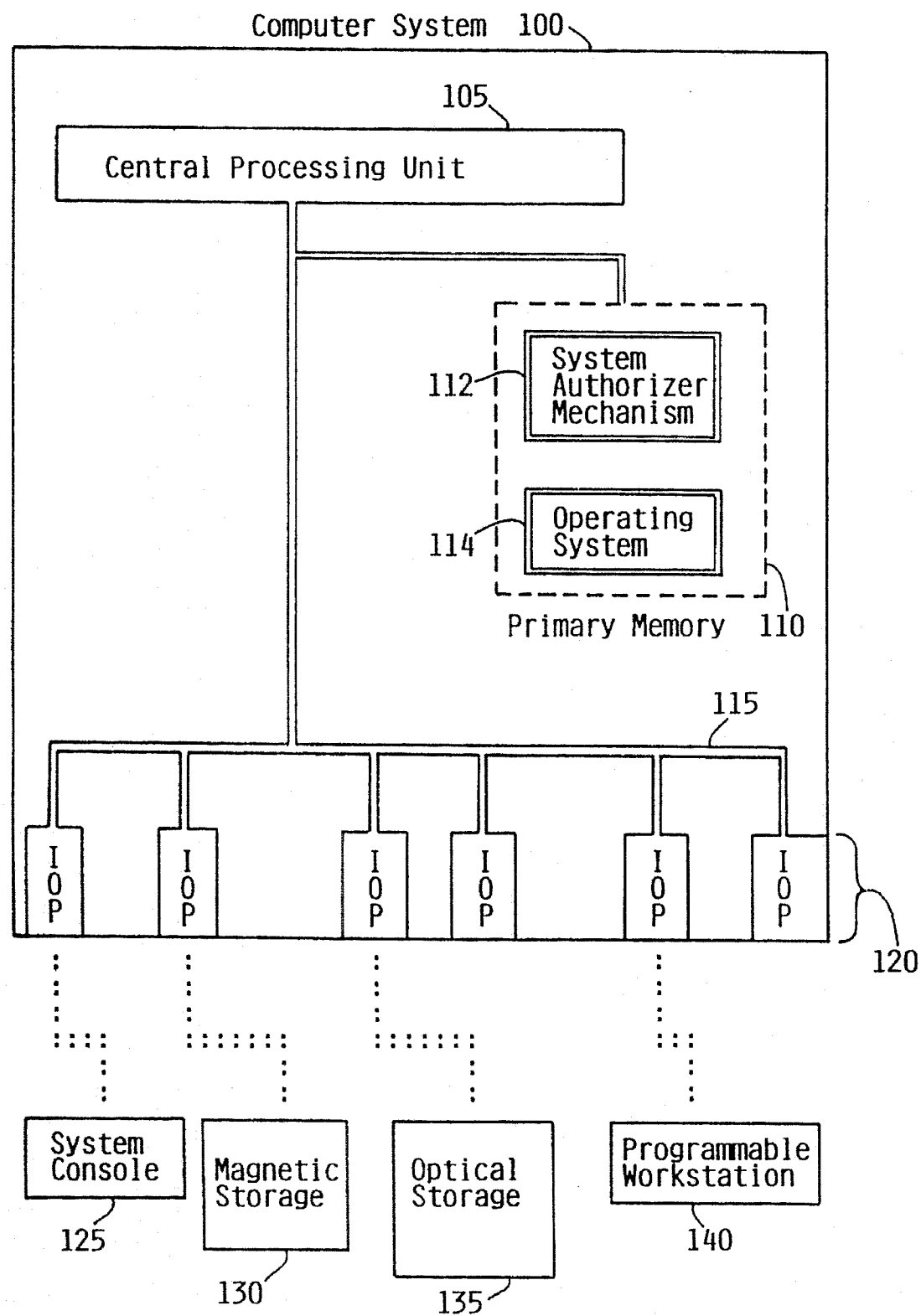
FIG. 1 shows the computer system of the present invention.

FIG. 1 shows a block diagram of the computer system of the present invention. The computer system of the preferred embodiment is an IBM AS/400 mid-range computer system. However, any computer system could be used. FIG. 1 shows an exploded view of computer system 100. Computer system 100 comprises main or central processing unit (CPU) 105 connected to primary memory 110 and system I/O bus 115. Although the system depicted in FIG. 1 contains only a single main CPU and a single system I/O bus, it should be understood that the present invention applies equally to computer systems having multiple main CPUs and multiple I/O buses. Similarly, although the I/O bus of the preferred embodiment is a typical hardwired, multidrop bus, any connection means that supports bi-directional communication could be used.

Connected to system I/O bus 115 are IOPs 120. Although FIG. 1 shows six IOPs and four external devices, it should be understood that the present invention applies equally to any number external devices connected to any number of IOPs. Each of IOPs 120 is designed to communicate with bus 115 and the external device for which it is responsible. The processors used in the IOPs of the preferred embodiment (IOPs 120) are Motorola 68020 micro computers, but other micro computers, such as the Intel 960, could be used. System console 125 is connected to bus 115 via one of the IOPs 120. System console 125 allows system administrators to communicate with computer system 100, normally through a non-programmable workstation. Similarly, magnetic storage 130, optical storage 135, and programmable workstation 140 are each connected to bus 115 via one of IOPs 120. Secondary storage devices 130 and 135 (i.e., magnetic storage 130, and optical storage 135) are used by computer system 100 as large storage repositories for data and programs. Programmable workstation 140 allows users and developers to communicate with computer system 100.

Primary memory 110 contains system authorizer mechanism 112 and operating system 114. System authorizer 112 is shown to reside in primary memory 110. However, it should be understood that while system authorizer 112 will typically be loaded into primary memory to execute, it may at some point reside in magnetic storage 130 or optical storage 135.

Figure 2:
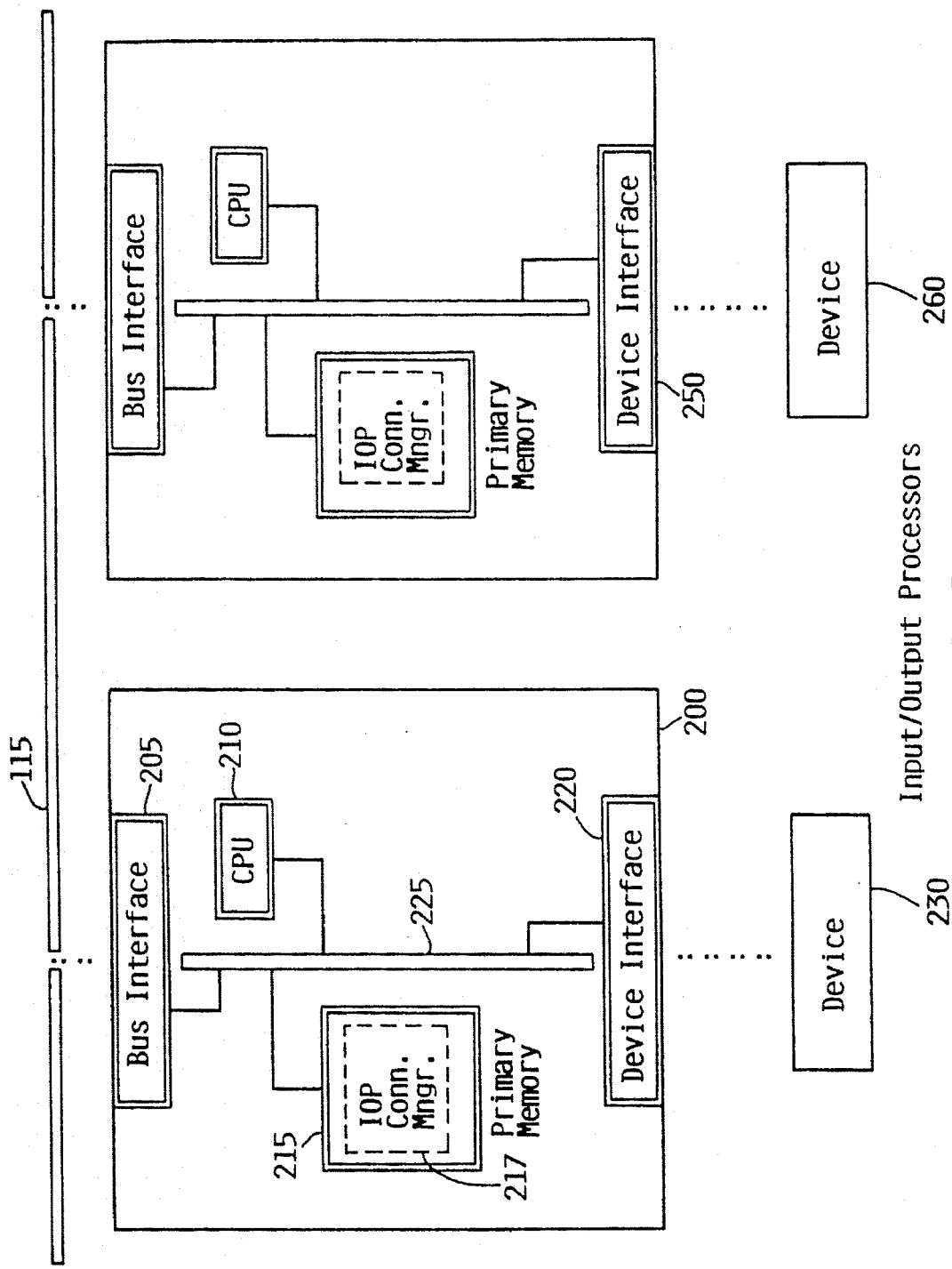
FIG. 2 shows the IOPs and the connection managers of the present invention.

FIG. 2 shows an exploded view of two of IOPs 120. As shown, IOPs 200 and 250 are used as interfaces between I/O bus 115 and devices 230 and 260. Focusing on IOP 200, FIG. 2 shows that CPU 210, bus interface 205, primary memory 215 and device interface 220 are all interconnected via bus 225. Residing in primary memory 215 is IOP connection manager 217.

While in many cases bus interface 205, CPU 210, primary memory 215, and bus 225 are the same in each of IOPs 120, IOP connection manager 217 and device interface 220 are usually device dependent. In other words, IOP connection manager 217 and device interface 220 may vary depending upon the nature of device 230. For example, if device 230 is a magnetic storage device, IOP connection manager 217 will usually be a server connection manager and device interface 220 will comprise input/output hardware commensurate with the magnetic storage device. If, in contrast, device 230 is a programmable workstation (PWS), IOP connection manager 217 will be a client connection manager and device interface 220 will similarly comprise input/output hardware commensurate with the PWS.

Figure 3:
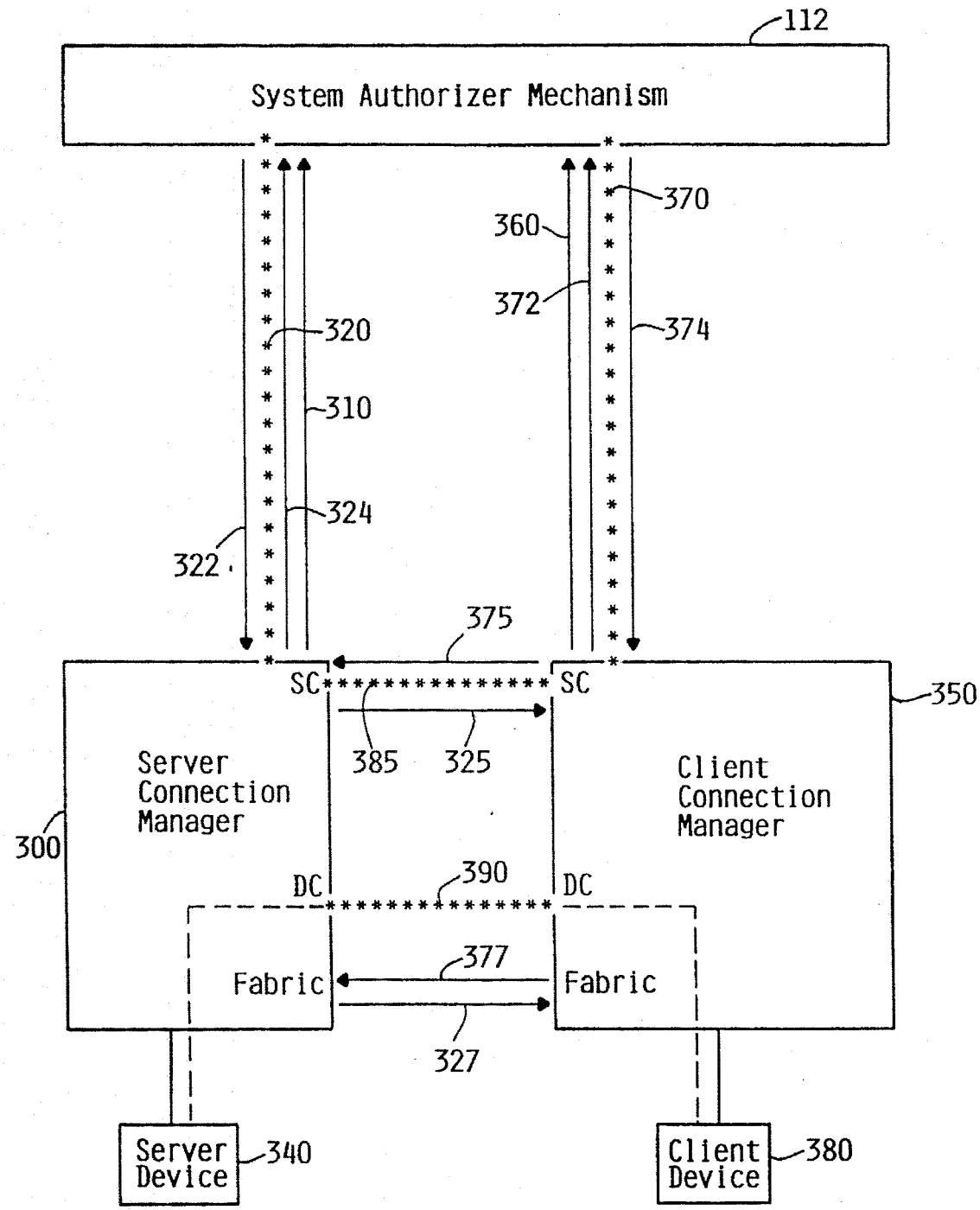
FIG. 3 shows a high level functional diagram of the message flow between the system authorizer and the client and server IOPs of the present invention.

FIG. 3 shows a functional flow diagram of the interaction between system authorizer 112 and server connection manager 300 and client connection manager 350. Two different types of logical connections are shown on FIG. 3. Services connections 320, 370, and 385 are used to pass connection oriented information while data connection 390 is used for data transmission. Although in the figures these connections appear as logical connections, it should be understood that these connections physically take place on I/O bus 115. In the preferred embodiment, the IBM Inter-process Communication Facility (IPCF) protocol is used to establish these logical connections. However, any protocol capable of creating logical connections could be used. For more information about the IPCF protocol, refer to U.S. Pat. No. 4,649,473 to Hammer et. al which is included herein by reference.

The names and locations of all of the IOPs are made known to system authorizer mechanism 112 as part of the initialization sequence for computer system 100. Similarly, the bus address and name of system authorizer mechanism 112 are made known to each of the IOPs. The need for authorization first occurs when an application running on client device 380 requires access to resources that exist on a different device. Client connection manager 350 begins the authorization process by sending request message 360 to system authorizer mechanism 112 via services connection 370. Request message 360 may indicate that a connection to a specific server IOP is desired or it may simply request access to particular information.

System authorizer mechanism 112 reacts to request message 360 by sending Peer to Peer Authorization message (hereafter PTPA message) 322 to server connection manager 300 via services connection 320. The format of PTPA message 322 is shown on FIG. 4. Although the fields and format of this message will be described in greater detail in the discussion associated with FIGS. 8-10, it is important to note the existence of server token 440. Server token 440 will be used later in the authorization process to determine whether server connection manager 300 should comply with an open request from a client connection manager. It is also important to note that server connection manager 300 only accepts tokens that are supplied by system authorizer mechanism 112.

After receipt of PTPA message 322, server connection manager 300 uses services connection 320 to respond to system authorizer mechanism 112 with Authorization Response (AR) message 324. If all is well with AR message 324, system authorizer mechanism 112 uses services connection 370 to send Open Peer to Peer System to IOP message (hereafter OPTPSTI message) 374 to client connection manager 350. The format of OPTPSTI message 374 is shown on FIG. 5. Although the fields and format of this message will be described in greater detail in the discussion associated with FIGS. 8A, 8B, 9A, 9B and 10, it is important to note the existence of server copy token 525. Server copy token 525 is used by client connection manager 350 to validate its resource request with server connection manager 300. Client connection manager 350 bundles server copy token 525 into Open Peer to Peer IOP to IOP message (hereafter OPTPITI message) 375 and sends the message to server connection manager 300 via services connection 385. (The format of OPTPITI message 374 is shown on FIG. 6.)

Upon receipt of OPTPITI message 375, server connection manager 300 compares server copy token 615 to server token 440. If the tokens match, server connection manager 300 sends Open Peer to Peer IOP to IOP response message (hereafter OPTPITIR message) 325, via services connection 385, to inform client connection manager 350 that access has been authorized. The data connection is then set up over data connection 390.

If the tokens do not match, server connection manager 300 informs system authorizer 112 of the invalid access attempt by sending Unauthorized Open Attempt message (hereafter UOA message) 310 via services connection 320. After dispatching this message, server connection manager 300 sends OPTPITIR message 325, via services connection 385, to inform client connection manager 350 that its access attempt has been rejected.

When system authorization mechanism 112 receives an UOA message, it has the responsibility of taking appropriate action. The appropriate action may range from "doing nothing" to sending a Cancel Token message (hereafter CT message) to server connection manager 350. The CT message is a command which effectively tells server connection managers to refrain from accepting access attempts that are associated with the subject token.

Upon receipt of OPTPITIR message 325, client connection manager 350 is required to inform system authorizer 112 of the outcome of the access attempt. To do so, client connection manager 350 sends Open Peer to Peer System to IOP Response message (hereafter OPTPSTIR message) 360 to system authorizer 112 via services connection 370.

Figure 4:
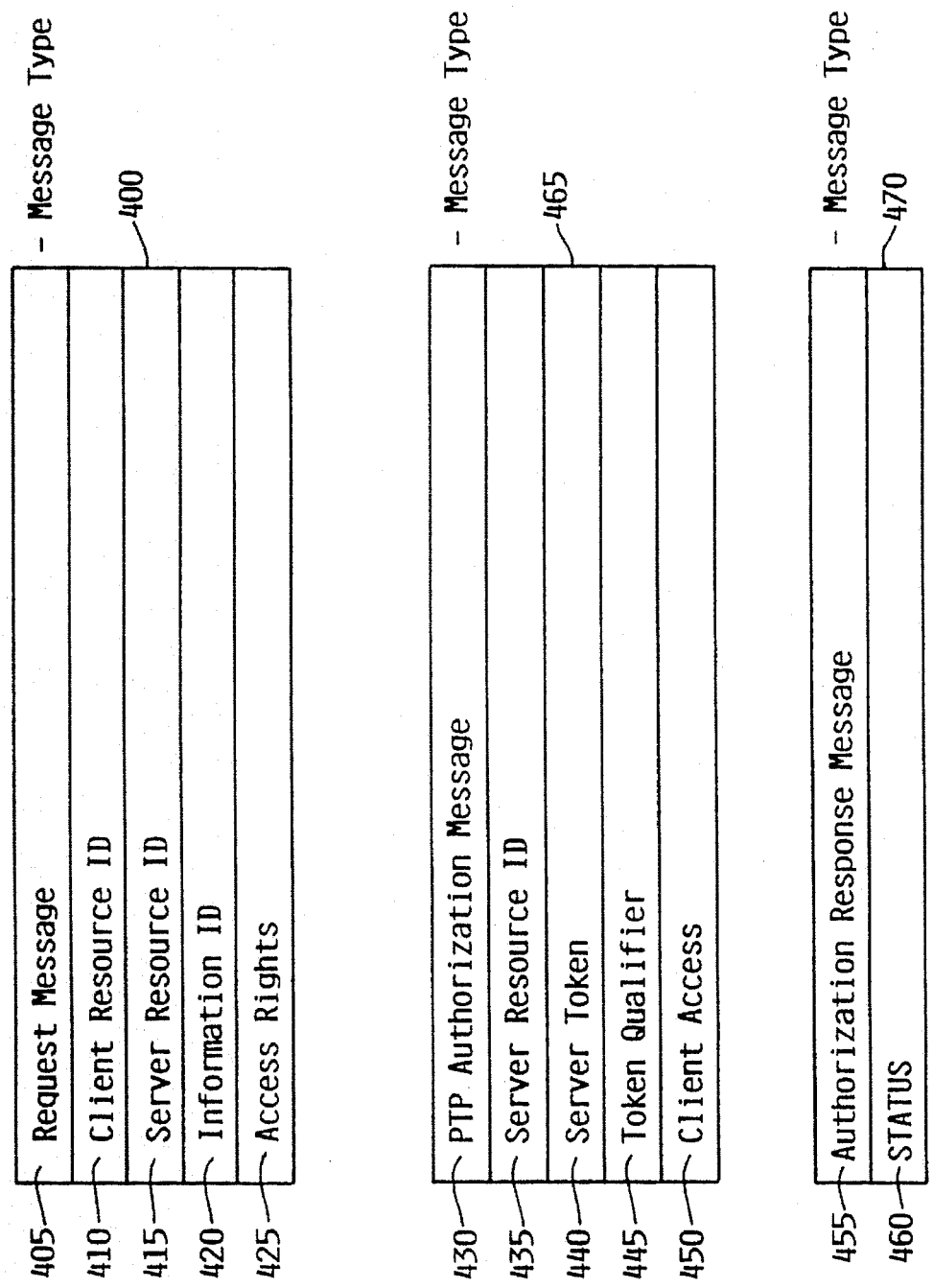
FIG. 4 shows block diagrams of the request message and the authorization and authorization response messages of the preferred embodiment.
Figure 5:
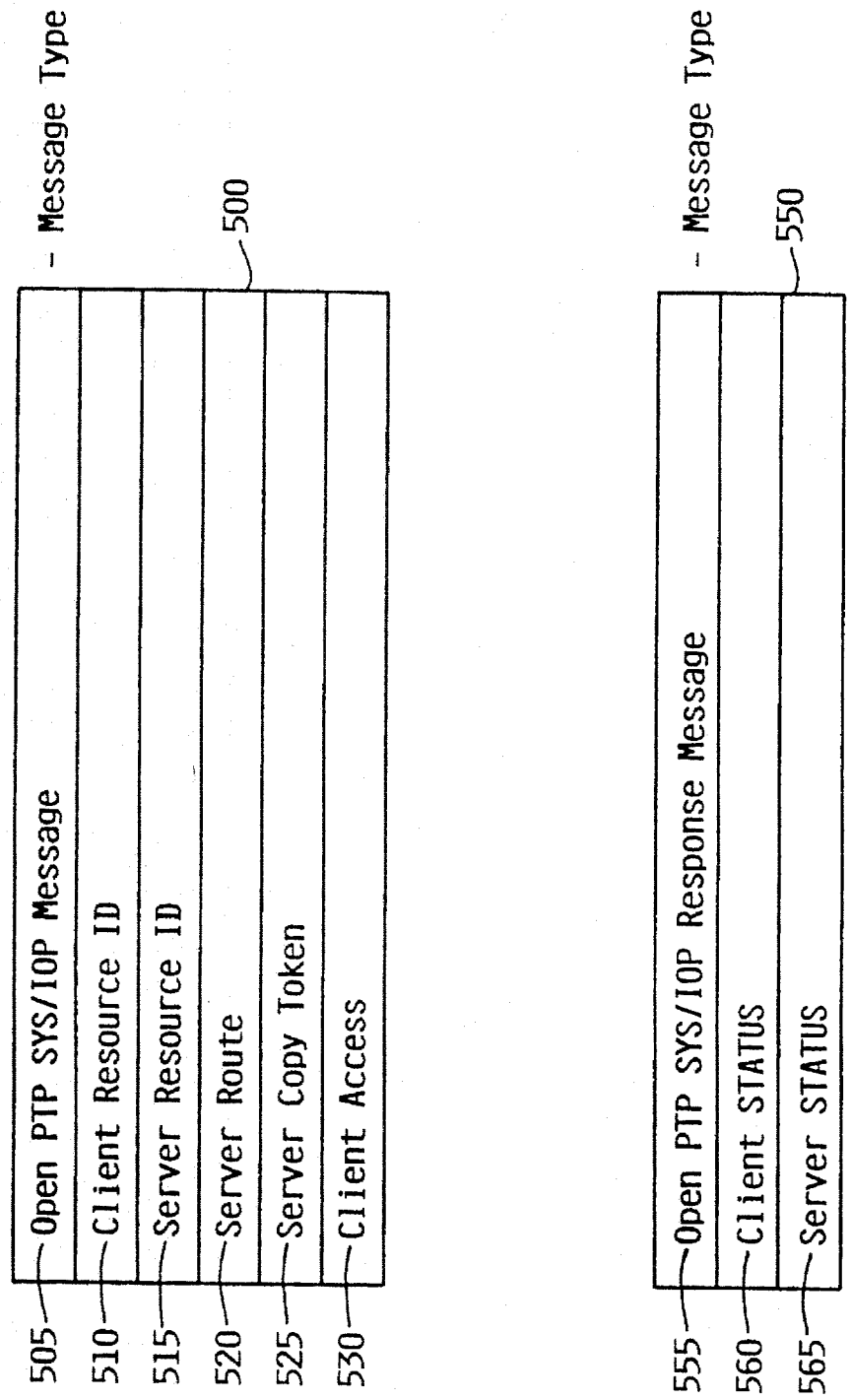
FIG. 5 shows block diagrams of the open and open response messages of the preferred embodiment.
Figure 6:
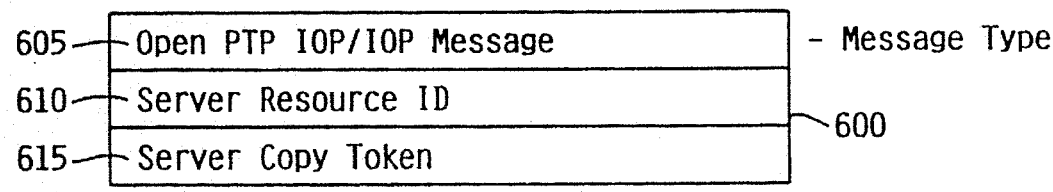
FIG. 6 shows block diagrams of the open, unauthorized open attempt, cancel token, and open response messages of the preferred embodiment.
Figure 6:
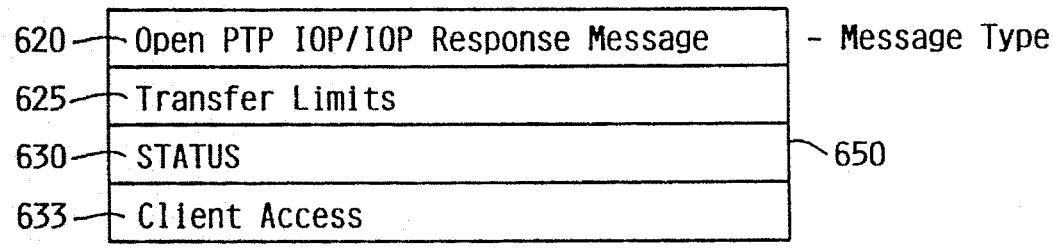
Figure 6:
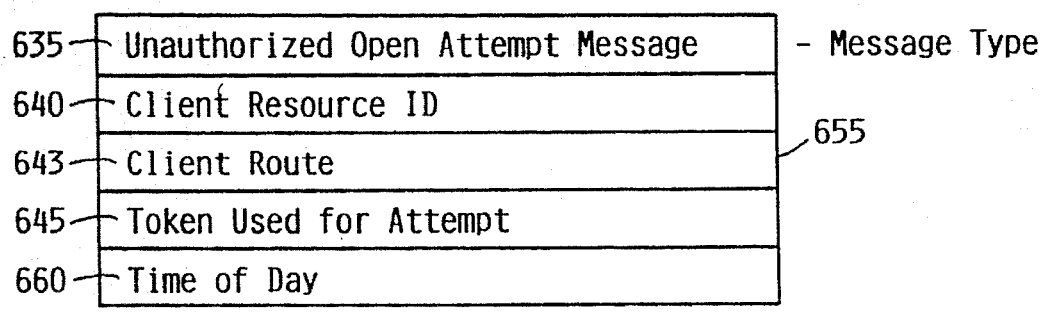
Figure 6:
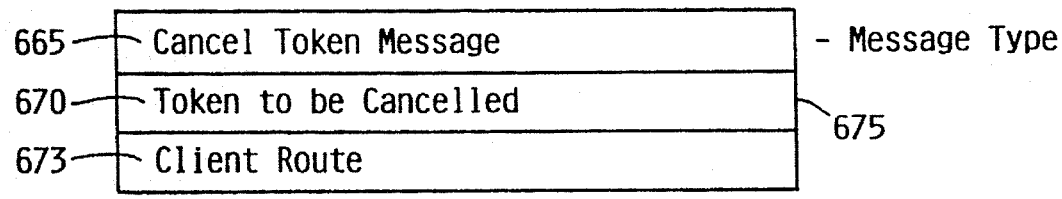

FIGS. 4–6 show the formats used for the messages of the preferred embodiment. These formats are described in detail in connection with the following discussion of FIGS. 8A, 8B, 9A, 9B and 10.

Figure 8B:
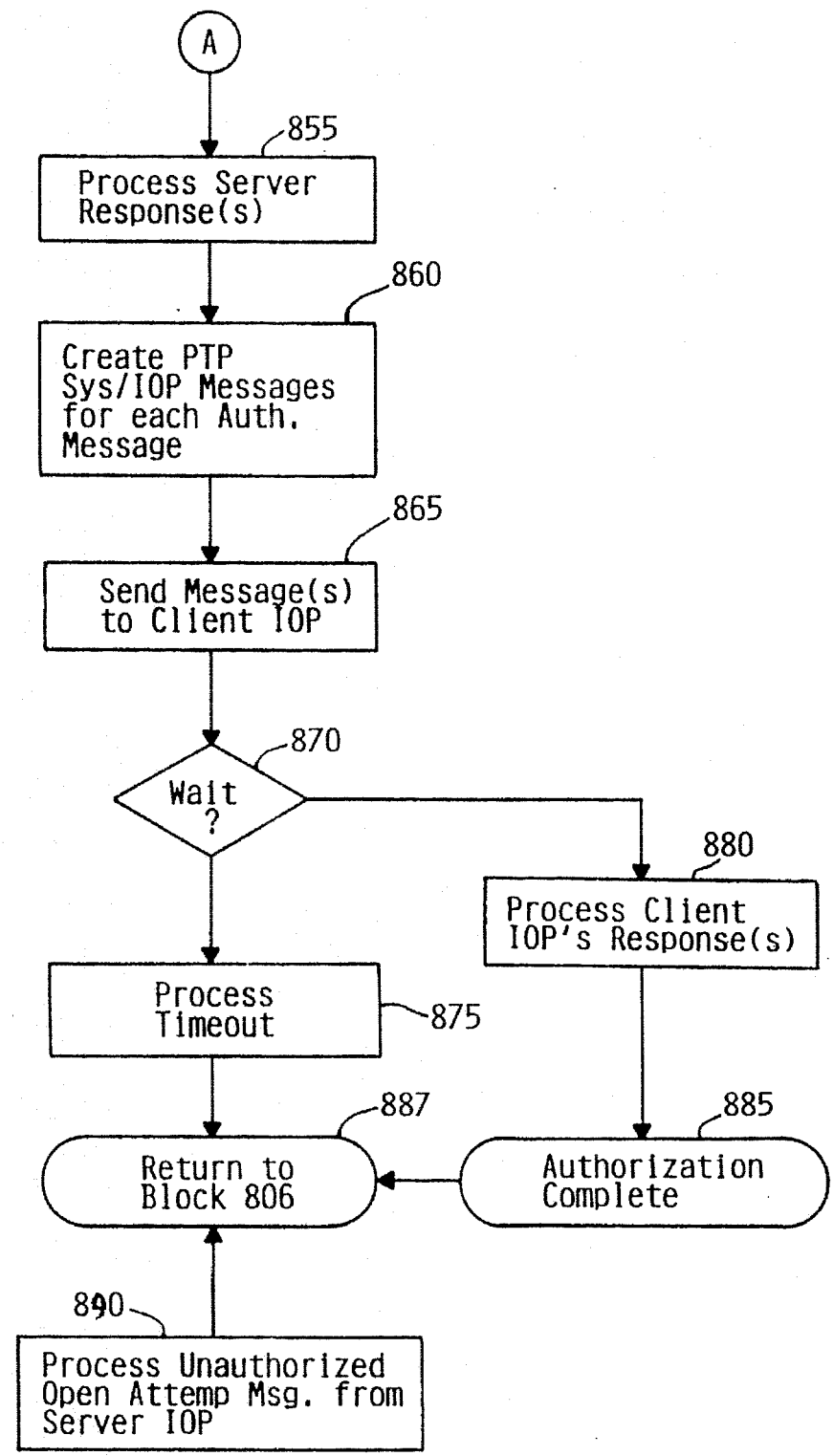

FIGS. 8A and 8B show a flow diagram of the steps taken by system authorizer mechanism 112 to authorize peer to peer connections. For the purposes of explanation, assume that client device 380 of FIG. 3 is a PWS running a multimedia application and that server device 340 of FIG. 3 is an optical storage device. Further assume that optical storage device 340 contains multimedia information that is required by the multimedia application running on PWS 380 and that client and server connection managers 350 and 300 of FIG. 3 are running on the IOPs associated with PWS 380 and optical storage device 340 respectively.

In block 800, system authorizer mechanism 112 obtains and stores in an appropriate table the names and locations of all the IOPs of computer system 100. As stated, this is accomplished as part of the initialization of computer system 100.

After initialization in block 800, system authorizer mechanism 112 waits for authorization requests 806. System authorizer mechanism 112 will return to this wait state whenever processing of an authorization request has been completed. Blocks 805 and 810 represent two different types of authorization requests. External authorization request 810 represents a request that originated in a device external to computer system 100. In the case at hand, the external request originated with multimedia PWS 380. Internal authorization request 805 represents a request that is system initiated. This latter request will be described in connection with the discussion of the first alternate embodiment.

When the multimedia application running on PWS 380 requires multimedia information, it will cause client connection manager 350 to send a request message to system authorizer mechanism 112.

FIG. 4 shows the format of the request message. This is the format that is used, for example, in request message 360. Request message format 400 comprises client resource ID field 410, server resource ID field 415, information ID field 420, and access rights field 425. Client resource ID field 410 is used to identify the client device that requires the information. In our multimedia example, the identity of PWS 380 would be contained in this field. Server resource ID field 415 is an optional field that contains location information about the server device. This field could be included in the message if the location of the requested information is known to the client device. In our example, this field would be included if the multimedia application knew that the information it needed was stored on optical storage device 340. Information ID field 420 is used to identify the information or when the locate of that information is unknown to the requestor. For example, the multimedia application running on PWS 380 may know what information it needs, but not where the information is located. In this case, system authorization mechanism 112 uses information ID field 420 to determine the whereabouts of the requested information. In the preferred embodiment, a table (not shown) which correlates particular information IDs to the location of the information is used; however, any means for associating a request for particular information to the location of that information could be used. Access rights field 425 indicates what type of access the client device requires. For example, the multimedia application running on PWS 380 may want to be authorized to write to as well as read from a particular storage device.

System authorizer mechanism 112 will receive this request in functional block 810. Based on the nature of the request and general system factors, system authorizer mechanism 112 will determine the type of token, the number of tokens sent out, and the distribution of token types 815. General system factors may include current system resource utilization, the location of the information, or any other factor that may affect how the request is processed. Blocks 820, 825, and 830 show the three different types of tokens that can be used. If system authorizer mechanism 112 chooses the single-use token type (shown as choice 830), the token or tokens that are sent out to the server or servers are used once and then destroyed. In our multimedia example, system authorizer mechanism 112 elects to use this token type when, based on the request from client connection manager 350, it determines that all the information could be obtained with a single access. In other words, system authorizer mechanism 112 may determine that the quantity or nature of the requested information is such that it may be retrieved without multiple access requests.

To expand on this example, further assume that some of the requested information was located on optical storage device 340, but that the remaining information was located on another optical storage device (not shown). In the multimedia example, this may occur if the video information were stored on optical storage device 340 and the audio information were stored on another optical storage device (not shown). When this is the case, system authorizer mechanism 112 sends single use tokens to server connection manager 300 and the server connection manager associated with the second optical storage device (not shown). The manner in which these tokens are later used by the subject client connection manager(s) is described in forthcoming paragraphs.

Reusable tokens (shown as choice 825) are used when system authorizer mechanism 112 determines that continued access to the information is required. In our example, system authorizer mechanism 112 may determine from the information supplied by client connection manager 350 that the multimedia application running on PWS 380 will require continued access to the information stored on optical storage device 340. Once again, the example is expanded by assuming that continued access to information stored on an additional optical storage device (not shown) is also required. If this were the case, system authorizer mechanism 112 would send reusable tokens to server connection manager 300 and the server connection manager associated with the second optical storage device (not shown).

The choice between a single-use token and a reusable token may also involve a tradeoff between security and performance. System authorizer mechanism 112 may choose to use a single access token over a reusable token when the information requested is sensitive in nature. Similarly, system authorizer mechanism 112 may choose to use a reusable token over a single-use token when overall system performance is a primary concern.

The last type of token, the generic token (shown as choice 820), is used to allow free access to the information on a particular server device. In our multimedia example, this may occur if system authorizer mechanism 112 determines that client devices other than PWS 380 will likely be in need of the information stored on optical storage device 340 and that such access should be freely granted. Once again, system authorizer mechanism 112 could determine that these conditions exist for more than just optical storage device 340 and send out multiple generic tokens.

As above, system authorizer mechanism 112 may also elect to use a generic token over the other types of tokens because of system performance concerns.

The encryption option (shown as decision block 835) is included in the preferred embodiment to provide additional security if required. It is important to note, however, that the present invention does not rely on the presence of encryption capability to perform its authorization function. As shown on FIG. 8A, the encryption option does not make sense when generic tokens have been chosen.

Figure 7:
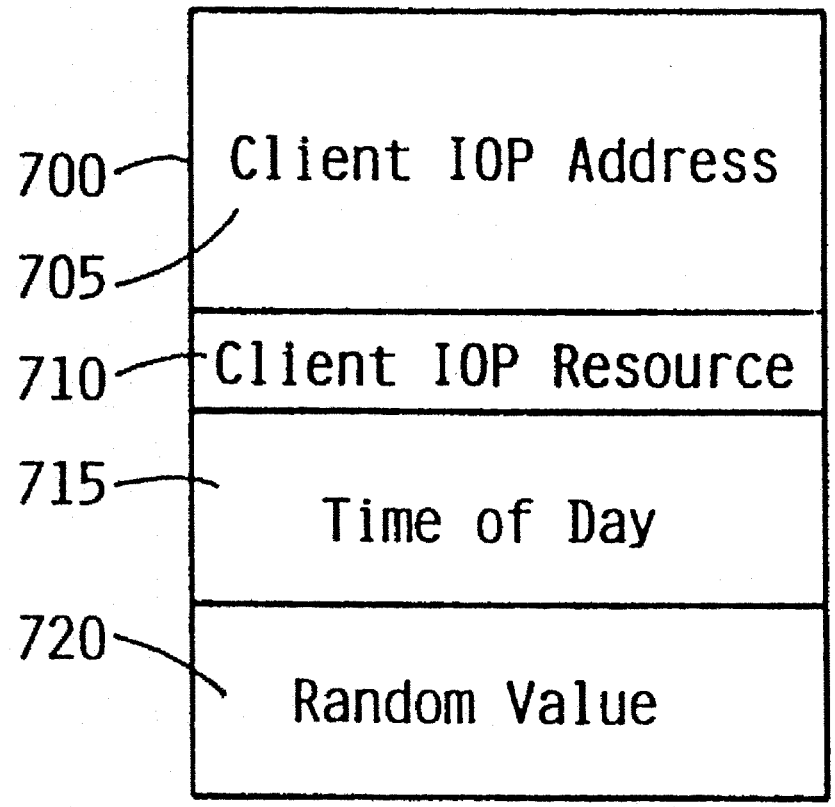
FIG. 7 shows a block diagram of the format of the token of the preferred embodiment.

Once the requested information has been located and the token or tokens of a particular type have been created (and possibly encrypted), system authorizer mechanism 112 bundles it/them into a PTPA message and sends the message(s) to the subject server connection manager(s). FIG. 4 shows the format of the PTPA message in more detail. Field 430 contains the PTPA message type indicator. Field 435 is used within the IPCF protocol to identify the entity for which the authorization is intended. Client access field 450 is used to indicate to the receiving server connection manager (here, server connection manager 300) what access rights have been requested by the client. Field 440 contains the actual token itself while field 445 contains the token type. Token qualifier field 445 contains an indication of the particular token's type (i.e., single use, multiple use, or generic). FIG. 7 shows the token format used in the preferred embodiment. Token format 700 comprises client IOP address 705, client IOP resource 710, time of day 715, and random value 720. Client IOP address 705 is a field which contains the location of the client IOP. In our multimedia example, this field would contain the address of the IOP that is running client connection manager 350. Client IOP resource 710 is a field which contains the identification of the resource that is requesting the information. In our example, this field would contain the identification of PWS 380. Time of day field 715 and random value 720 are used for uniqueness and encryption purposes should additional security be required.

In our example, the token would be sent to server connection manager 300 and perhaps others 845. Once this is accomplished, system authorizer mechanism 112 will determine whether the nature of the request and/or general system factors require the use of another token type 850. This scenario can be best explained by reconsidering our expanded multimedia example. Beyond assuming that the required information is located on more than one server device, assume further that the access needs for the server devices are different. For example, the multimedia application may need continuous access to the video information stored on optical storage device 340, but only a single access to the audio information stored on the other optical storage device (not shown). If this were the case, system authorizer mechanism 112 would elect to send a reusable token to server connection manager 300 and a single-use token to the server connection manager (not shown) associated with the other optical storage device (not shown).

When all of the PTPA messages have been dispatched, system authorizer mechanism 112 will begin processing the AR messages that it has received 855. The format of the AR message is shown on FIG. 4. AR format 470 comprises message type field 455 and status field 460. Status field 460 is used by system authorizer 112 to determine whether it is appropriate to proceed. For example, it would not be appropriate to continue if status field 460 indicated that optical storage device 340 was currently unavailable.

Assuming that all is well, system authorization mechanism 112 will proceed to build the necessary OPTPSTI message(s) at step 860. The format of the OPTPSTI message is shown on FIG. 5. OPTPSTI message format 500 comprises message type field 505, client resource ID field 510, server resource ID field 515, server route field 520, server copy token field 525, and client access field 530. Client resource ID field 510 identifies the client device for which the authorization is intended. In our case, PWS 380 has made the request and is, therefore, the client device which has been authorized to access the information stored on optical storage device 340. Server route field 520 contains location information that is used by client connection manager 350 to initiate the connection between PWS 380 and optical storage device 340. Server copy token field 525 contains the copy of the token that must be used to gain access to the information stored on optical storage device 340. Lastly, client access field 530 is used to inform client connection manager 350 of the access rights that have been authorized.

When the appropriate message(s) has been created, it is sent to client connection manager 350 in block 865. At this point, system authorizer mechanism 112 waits to get a response back from client connection manager 350 in block 870. FIG. 5 shows the format of the OPTPSTIR message. OPTPSTIR message format 550 comprises message type field 555, client status field 560, and server status field 565. The status field in each message is used to indicate the status of the subject device. The status fields are processed in block 880 of FIG. 8B. If the authorized connection took place, the status fields will so indicate. (The manner in which connections are made is described in the discussion of FIGS. 9A, 9B and 10.) If a connection did not take place, the fields will cause system authorizer mechanism 112 to take remedial action (not shown). This remedial action could range from "doing nothing" to canceling the appropriate tokens.

The manner in which system authorizer mechanism 112 processes the UOA message (shown in block 890) will be described in connection with the discussion of FIGS. 9A and 9B.

Figure 9A:
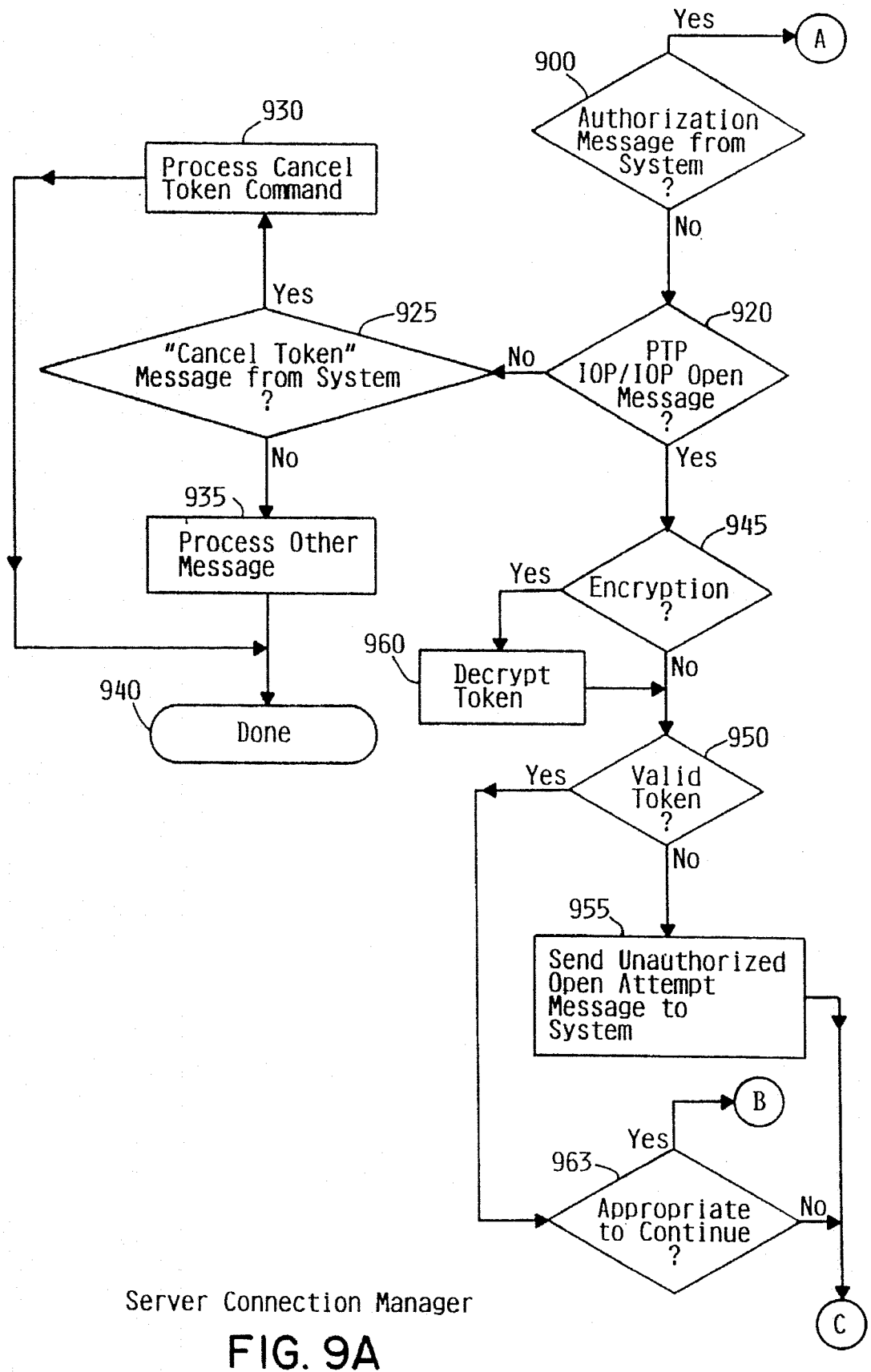
FIGS. 9A and 9B show a logic flow diagram of the server IOP connection manager of the present invention.
Figure 9B:
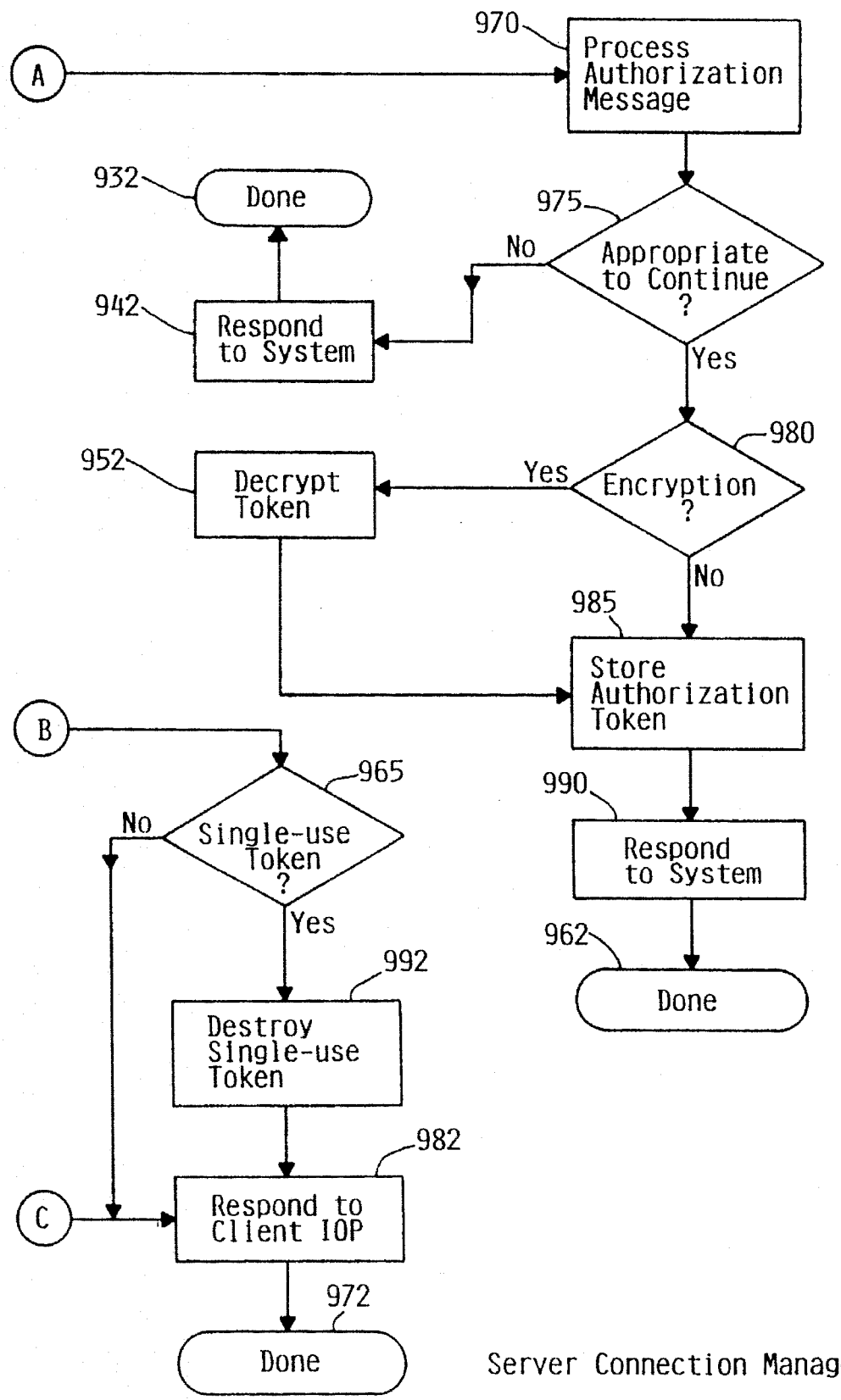

FIGS. 9A and 9B show the process flow for server connection manager 300. In the description of FIG. 8A, block 845, we saw that the PTPA message(s) were sent from system authorizer 112 to server connection manager 300. (Refer to the discussion of FIGS. 8A and 8B for a detailed description of the format of the PTPA message.) Server connection manager 300 receives this message(s) in functional block 900 and proceeds to process the message(s) in block 970. In block 975, server connection manager 300 determines whether it is possible to process the request associated with the message(s). It may not be possible if, for example, optical storage device 340 was inoperable at the time of the request or if the IOP itself did not have enough resources to process the request. If this were the case, connection manager 300 would so indicate in its AR message to system authorizer mechanism 112 (shown by blocks 975 and 942) and complete 932. (Refer to the discussion of FIGS. 8A and 8B for a detailed description of the format of the AR message.) If it is appropriate for server connection manager 300 to continue, the encryption option is dealt with (shown by blocks 980 and 952) and the token is stored 985.

Server connection manager 300 will then send the appropriate AR message back to system authorizer mechanism 112 (shown by block 990) and complete 962.

Figure 10:
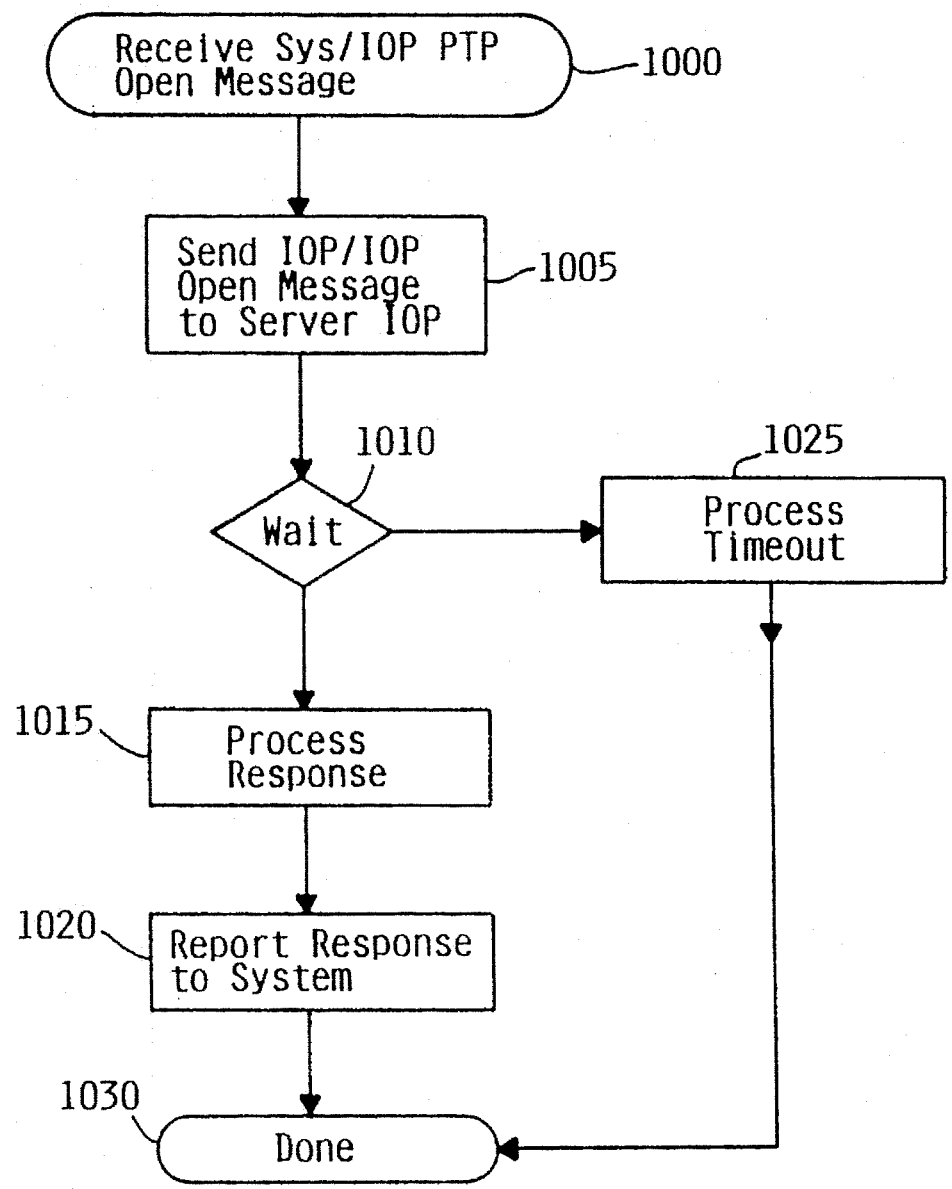
FIG. 10 shows a logic flow diagram of the client IOP connection manager of the present invention.

Refer now to FIG. 10. (The remaining blocks of FIGS. 9A and 9B relate to processing that is associated with messages that are sent by client connection manager 350 and system authorizer mechanism 112. These blocks are better understood when the origin of these messages has been explained.) FIG. 10 shows that the OPTPSTI message from system authorizer 112 is received by client connection manager 350 in block 1000. Client connection manager 350 responds to the OPTPSTI message from system authorizer 112 by creating and sending an OPTPITI message to server connection manager 300. FIG. 6 shows the format of the OPTPITI message. OPTPITI message 600 comprises message type 605, server resource ID 610, and server copy token 615. Server resource ID field 610 is used to identify the resource which contains the required information. Server copy token field 615 contains the copy token that was received from system authorizer 112.

Referring back to FIG. 9A, the OPTPITI message is received by server connection manager 300 in block 920. After dealing with optional encryption (shown by blocks 945 and 960), server connection manager 300 determines whether the copy token that it received in the OPTPITI message is valid 950. The validation is performed by comparing the copy token to the token that was received in the PTPA message. If the token is valid, server connection manager 300 next asks whether it is appropriate to continue processing the request 963. As above, connection manager 300 is concerned with whether the IOP and the device have enough resources to process the request associated with the token. After the token's validity and the availability of resources have been ensured, server connection manager 300 determines whether the token is a single use token 965. If the token is a single use token, it is destroyed 992 by deleting it from IOP storage. After this decision has been made, server connection manager 300 responds to client connection manager 350 with a OPTPITIR message 982. FIG. 6 shows the format of a OPTPITIR message. OPTPITIR message 650 comprises message type field 620, transfer limits field 625, status field 630, and client access field 633. Transfer limits field 625 will contain such information as the maximum size of message packets and the maximum speed at which they can be transmitted. Status field 630 is used to inform client connection manager 350 of the outcome of the open attempt. As above, client access field 633 is used to inform client connection manager 350 of the access rights that have been authorized.

If server connection manager 300 determines that the copy token is invalid, it will send an UOA message to system authorizer 112 (shown by block 955) before responding to client connection manager 350. FIG. 6 shows the format of the UOA message. UOA message 655 comprises message type field 635, client resource ID field 640, client route field 643, the token that was used in the attempt 645 (i.e., the token contained in server copy token field 615 of the subject OPTPITI message), and time of day field 660. The client resource ID field identifies the client device and the client IOP that are responsible for the rejected open attempt. In our multimedia example this would be PWS 380 and the associated IOP (identified by client route field 643). This message is then processed by system authorizer mechanism 112 in block 890 of FIG. 8B. As stated, system authorizer mechanism 112 must determine what remedial action is required. If system authorizer mechanism 112 decides to cancel the valid token, it will send a CT message (not shown) to server connection manager 300. FIG. 6 shows the format of the CT message. CT message format 675 comprises message type field 665, the token to be cancelled 670, and the client route that is associated with the token to be cancelled 673. This message is received by server connection manager 300 in block 925 of FIG. 9A. Server connection manager 300 responds to the CT message by destroying the token 930 for the specified IOP. Server connection manager 300 then completes processing 940.

Referring lastly to FIG. 10, client connection manager 350 will receive the OPTPITIR message from server connection manager 300 in block 1015. If the status field of the OPTPITIR message indicates that a connection has been authorized, client connection manager 350 will initiate the authorized data connection 1015 and send a OPTPSTIR message 1020 to system authorizer mechanism 112 to notify it of such. If the OPTPITIR message indicates that a connection has not been authorized, client connection manager 350 must nevertheless use an OPTPSTIR message to notify system authorizer mechanism of the failed attempt. Although this action is required of the client IOP, a rogue client IOP that does not comply with the requirement will not go undetected. As mentioned above, the server connection manager also has the responsibility of notifying the system authorizer (see block 955 of FIG. 9A).

In the first alternate embodiment, system authorizer mechanism 112 receives the authorization request internally from computer system 100 itself 805. This would occur when an application running on CPU 105 determined that the devices associated with two or more IOPs should work together to achieve a particular task. At this point the authorization process would continue as has been described above.

In the second alternate embodiment, the present invention is applied to a network of computers. It should be understood that while the preferred embodiment uses the present invention to authorize connections between the IOPs of a single computer system, the present invention can also be used in a network environment. In this alternate embodiment, IOPs 120 are replaced by one or more independent computers and bus 115 is replaced one or more physical networking interfaces. Examples of such interfaces include: IEEE 802.5 (Token Ring), IEEE 802.4 (Token Bus), IEEE 802.3 (Ethernet), FDDI, X.25, and ISDN. The methods and apparatus described in the primary and first alternate embodiment apply equally to this embodiment.

Although a specific embodiment along with certain alternate embodiments have been disclosed, it will be understood by those skilled in the art that additional variations in form and detail may be made within the scope of the following claims.

What is claimed is:

1. A method for providing secure access to resources controlled by a server entity, said method comprising the steps within said server entity of:

receiving a first authorization token from an authorizer entity, said first authorization token being generated by said authorizer entity based on previous communication with a client entity, said server entity, said client entity and said authorizer entity being mutually interconnected; and validating a second authorization token to ensure that said client entity is permitted to access said resources by comparing said second authorization token with said first authorization token, said second authorization token being received as part of a request to said server entity from said client entity.

2. The method of claim 1 wherein said receiving step comprises receiving a generic authorization token.

3. The method of claim 1 wherein said receiving step comprises the step of receiving a reusable authorization token.

4. The method of claim 1 wherein said receiving step comprises the step of receiving a single-use authorization token.

5. A server entity that provides secure access to resources controlled by said server entity, said server entity comprising:

a token receiving mechanism that receives a first authorization token from an authorizer entity and a second authorization token from a client entity, said first authorization token being generated by said authorizer entity based on previous communication with said client entity, said server entity, said client entity and said authorizer entity being mutually interconnected; and a token validating mechanism, said token validating mechanism ensuring that said client entity is permitted to access said resources by validating said second authorization token through comparison of said second authorization token with said first authorization token.

6. The server entity of claim 5 wherein said token receiving mechanism further comprises the capability of receiving a generic authorization token.

7. The server entity of claim 5 wherein said token receiving mechanism further comprises the capability of receiving a reusable authorization token.

8. The server entity of claim 5 wherein said token receiving mechanism further comprises the capability of receiving a single-use authorization token.

\* \* \* \* \*